United States Patent
Pedersen et al.

(10) Patent No.: US 11,434,868 B2
(45) Date of Patent: Sep. 6, 2022

(54) METHOD OF INSTALLING A ROTOR ON A WIND TURBINE, A ROTOR HUB AND COUNTERWEIGHT ASSEMBLY, AND A LIFTING APPARATUS CONNECTING MEMBER

(71) Applicant: Vestas Wind Systems A/S, Aarhus N. (DK)

(72) Inventors: Gunnar K. Storgaard Pedersen, Skjern (DK); Christian Skov Frederiksen, Videbæk (DK); Anton Bech, Ciudad Real (ES)

(73) Assignee: Vestas Wind Systems A/S, Aarhus N (DK)

( * ) Notice: Subject to any disclaimer, the term of this patent is extended or adjusted under 35 U.S.C. 154(b) by 15 days.

(21) Appl. No.: 17/263,227

(22) PCT Filed: Jul. 25, 2019

(86) PCT No.: PCT/DK2019/050235
§ 371 (c)(1),
(2) Date: Jan. 26, 2021

(87) PCT Pub. No.: WO2020/020425
PCT Pub. Date: Jan. 30, 2020

(65) Prior Publication Data
US 2021/0164435 A1 Jun. 3, 2021

(30) Foreign Application Priority Data
Jul. 27, 2018 (DK) .......................... PA 2018 70505

(51) Int. Cl.
*F03D 1/06* (2006.01)
*F03D 13/10* (2016.01)
(Continued)

(52) U.S. Cl.
CPC ............ *F03D 1/0658* (2013.01); *B66C 1/108* (2013.01); *F03D 13/10* (2016.05); *B66C 23/185* (2013.01);
(Continued)

(58) Field of Classification Search
CPC ....... F03D 1/0658; F03D 13/10; B66C 1/108; B66C 23/185; F05B 2230/61
See application file for complete search history.

(56) References Cited

U.S. PATENT DOCUMENTS 7,162,941 B2   1/2007   Kovacic et al.
7,165,941 B2 *  1/2007   Wobben ................. F03D 13/10
                                                           416/144

(Continued)

FOREIGN PATENT DOCUMENTS

DE   102009011603 A1   9/2010
EP       1412638 B1   12/2007
(Continued)

OTHER PUBLICATIONS

Danish Patent and Trademark Office, Search and Examination Report in PA 2018 70505, dated Jan. 22, 2019.
(Continued)

*Primary Examiner* — Eldon T Brockman
(74) *Attorney, Agent, or Firm* — Wood Herron & Evans LLP

(57) ABSTRACT

A method of installing a rotor on a nacelle (44) on a wind turbine generally includes providing a rotor hub counterweight assembly (10, 10') which are rotated and lifted from a downtower location to an uptower location at which wind turbine blades (50, 52, 54) are progressively attached and the counterweights (14, 16), (14', 16') are progressively removed. The rotor hub and counterweight assembly (10, 10') for use when installing a rotor on a wind turbine (46)
(Continued)

generally includes a rotor hub (12) having first, second and third flanges (18, 20, 22), a first counterweight (14, 14'), a second counterweight (16, 16'), and a lifting apparatus connecting member (26, 26'). A lifting apparatus connecting member (26) is configured with at least two connection points (60, 62) being configured for allowing at least two of three operations including installation, rotating and lifting the rotor hub (12), and removal of the lifting apparatus connecting member (26').

14 Claims, 14 Drawing Sheets

(51) Int. Cl.
*B66C 1/10* (2006.01)
*B66C 23/18* (2006.01)

(52) U.S. Cl.
CPC ....... *F05B 2230/61* (2013.01); *F05B 2240/21* (2013.01)

(56) References Cited

U.S. PATENT DOCUMENTS

| | | | | |
|---|---|---|---|---|
| 8,191,253 | B2 * | 6/2012 | Vangsy | F03D 13/10 29/889.1 |
| 9,303,620 | B2 * | 4/2016 | Falkenberg | F03D 13/10 |
| 9,416,767 | B2 * | 8/2016 | Trede | F03D 13/10 |
| 10,830,204 | B2 * | 11/2020 | Neumann | F03D 13/10 |
| 11,155,445 | B2 * | 10/2021 | Jensen | B66C 1/108 |
| 2004/0253109 | A1 * | 12/2004 | Wobben | F03D 1/0658 416/144 |
| 2009/0159549 | A1 * | 6/2009 | Trede | F03D 1/0658 212/270 |
| 2009/0324380 | A1 | 12/2009 | Pedersen | |
| 2010/0005656 | A1 * | 1/2010 | Vangsy | F03D 13/10 29/889 |
| 2013/0269188 | A1 * | 10/2013 | Falkenberg | F03D 7/0224 29/889 |
| 2014/0319091 | A1 * | 10/2014 | Trede | B66C 1/62 212/270 |
| 2014/0341742 | A1 | 11/2014 | Knoop et al. | |
| 2016/0090962 | A1 | 3/2016 | Gil Moll et al. | |
| 2019/0085818 | A1 * | 3/2019 | Neumann | F03D 13/10 |
| 2020/0062551 | A1 * | 2/2020 | Jensen | B66C 1/108 |

FOREIGN PATENT DOCUMENTS

| | | |
|---|---|---|
| EP | 2650537 B1 | 12/2014 |
| EP | 2924283 A1 | 9/2015 |
| EP | 2924284 A1 | 9/2015 |
| WO | 2014076825 A1 | 5/2014 |

OTHER PUBLICATIONS

European Patent Office, International Search Report and Written Opinion in PCT Application No. PCT/DK2019/050235, dated Oct. 22, 2019.

* cited by examiner

METHOD OF INSTALLING A ROTOR ON A WIND TURBINE, A ROTOR HUB AND COUNTERWEIGHT ASSEMBLY, AND A LIFTING APPARATUS CONNECTING MEMBER

TECHNICAL FIELD

The present invention generally relates to apparatus and methods for improving the process of wind turbine blade attachment to a wind turbine hub.

BACKGROUND

Generally, wind turbine blades are attached to a wind turbine hub at an uptower location after the hub has been mounted to a nacelle of the wind turbine. Then, turbine blades are generally attached one-by-one to a wind turbine nacelle hub. For this reason, there is a need to rotate the hub with fewer than three blades attached. That is, the rotor is rotated in an incomplete and unbalanced condition. This is achieved by imparting a rotary motion to the nacelle main shaft. There are many ways to rotate the main shaft during wind turbine construction. A preferred method includes bringing a drive apparatus into engagement with the high speed output shaft from the gearbox in the nacelle. A rotary drive applied to the gearbox output shaft has the effect of slowly turning the main shaft. But, the asymmetric or unbalanced loading of the hub places a significant torque on the gearbox transmission during this process. In general, any method of main shaft rotation when the rotor is unbalanced will place the transmission under extreme stress.

Previous methods and apparatus are known for mounting three counterweights to a hub during the blade installation process. For example, U.S. Pat. No. 7,165,941 and EP2650537 each provide examples of using counterweight systems to mitigate imbalance. In U.S. Pat. No. 7,165,941 counterweights are successively removed as blades are progressively attached. EP2650537 discloses a counterweight whose torque effect is adjustable.

It would be desirable to simplify and speed up the procedure of mounting a hub to a nacelle and the attendant process of mounting blades to the hub, while keeping the torque requirement for the rotor drive to a minimum. It would also be desirable to simplify both the rotor hub and blade assembly procedure and the equipment used during the procedure.

SUMMARY

In one illustrative embodiment the invention provides a method of installing a rotor on a nacelle of a wind turbine. The method includes providing a rotor hub at a downtower location, the rotor hub having first, second and third flanges at positions spaced 120 degrees apart and extending around the axis of rotation of the rotor hub. A first counterweight is provided at the downtower location mounted to the first flange. A second counterweight is provided at the downtower location mounted to the second flange. A lifting apparatus connecting member is provided at the downtower location mounted to the third flange. The first and second counterweights and the lifting apparatus connecting member may be mounted to the respective flanges at the downtower location or one or more of these components may be mounted to the respective flange and then transported as an assembly to the downtower location. The method further comprises connecting a portion of the lifting apparatus to the lifting apparatus connecting member at the downtower location, lifting the rotor hub and the first and second mounted counterweights to an uptower location adjacent a hub connection side of the nacelle, and mounting the rotor hub to the hub connection side.

The method may include various further aspects, such as described below, as representative examples. Mounting the rotor hub to the hub connection side may be accomplished such that the third flange is at the 12-o'clock position, and the first and second flanges are respectively at the 4-o'clock and 8-o'clock positions. The method may further comprise removing the lifting apparatus connecting member; rotating the rotor hub such that the third flange is at the 3-o'clock position, and the first and second flanges and the first and second counterweights are respectively at the 7-o'clock and 11-o'clock positions; mounting a first wind turbine blade to the third flange while the third flange is at the 3-o'clock position; rotating the rotor hub such that the first flange and first counterweight are at the 3-o'clock position, the third flange and first wind turbine blade are at the 11-o'clock position, and the second flange and second counterweight are at the 7-o'clock position; removing the first counterweight at the 3-o'clock position; mounting a second wind turbine blade to the first flange while the first flange is at the 3-o'clock position; rotating the rotor hub such that the second flange and second counterweight are at the 3-o'clock position, the first flange and second wind turbine blade are at the 11-o'clock position, and the third flange and first wind turbine blade are at the 7-o'clock position; removing the second counterweight at the 3-o'clock position; and mounting a third wind turbine blade to the second flange while the second flange is at the 3-o'clock position.

The method may further comprise rotating the rotor hub in a direction transverse to the axis of rotation of the rotor hub during the step of lifting the rotor hub. Lifting the rotor hub may further comprise initially standing the rotor hub on respective first and second base portions of the first and second counterweights at the downtower location. The first and second base portions may comprise convexly configured feet and lifting the rotor hub may further comprise initially rotating the rotor hub while supporting the rotor hub on the convexly configured feet. The lifting apparatus connecting member may further comprise first and second lifting points, and the method may further comprise using the first lifting point to move the lifting apparatus connecting member into position for mounting to the third flange; and using the second lifting point during the step of lifting the rotor hub and the first and second mounted counterweights to the uptower location. The lifting apparatus connecting member may further comprise a third lifting point, and the method may further comprise using the third lifting point while removing the lifting apparatus connecting member from the third flange. The said first and second and third lifting points may be spaced from each other along a longitudinal extent of said connecting member. A first lifting point may be an installing lifting point. A second lifting point may be a carrying lifting point. A third lifting point may be a removal lifting point.

In another illustrative embodiment the invention provides a rotor hub and counterweight assembly for use when installing a rotor on a wind turbine. The assembly comprises a rotor hub having first, second and third flanges at positions spaced 120 degrees apart and extending around the axis of rotation of the rotor hub; a first counterweight mounted to the first flange; a second counterweight mounted to the second flange; and a lifting apparatus connecting member mounted to the third flange.

The first and second counterweights further may comprise first and second base portions for standing the assembly up at a downtower location after initially rotating the assembly and before further lifting the assembly to an uptower location. The first and second base portions may further comprise convexly configured feet for initially rotating the rotor hub approximately 90 degrees in a direction transverse to the axis of rotation of the rotor hub while supporting the rotor hub on the convexly configured feet. The lifting apparatus connecting member may further comprise first and second connection points. The first connection point is used to move the lifting apparatus connecting member into position for mounting to the third flange at a downtower location, and the second connection point is used to rotate and lift the assembly to an uptower location. The lifting apparatus connecting member may further comprise a third connection point. The third connection point is used to remove the lifting apparatus connecting member from the third flange.

In another illustrative embodiment the invention provides a lifting apparatus connecting member configured to be mounted to a flange of a wind turbine rotor hub, the lifting apparatus connecting member being couplable to a lifting apparatus for lifting the rotor hub and mounted counterweights from a downtower location to an uptower location and mounting the rotor hub to a wind turbine nacelle. The lifting apparatus connecting member includes at least two lifting points for coupling with the lifting apparatus. The two lifting points are configured for allowing at least two of the three following operations: i) installing the lifting apparatus connecting member on the third flange, ii) rotating and lifting the rotor hub and counterweights to the uptower location, and iii) removing the lifting apparatus connecting member from the third flange.

The lifting apparatus connecting member may further comprise a third lifting point for allowing the third of the three operations to be performed. The lifting apparatus connecting member may further include first and second ends. A first lifting point for installing the lifting apparatus connecting member on the third flange may be located proximate the first end. A third lifting point for removing the lifting apparatus connecting member from the third flange may be located proximate the second end. A second lifting point for rotating and lifting the rotor hub and counterweights may be located between the first and second lifting points.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
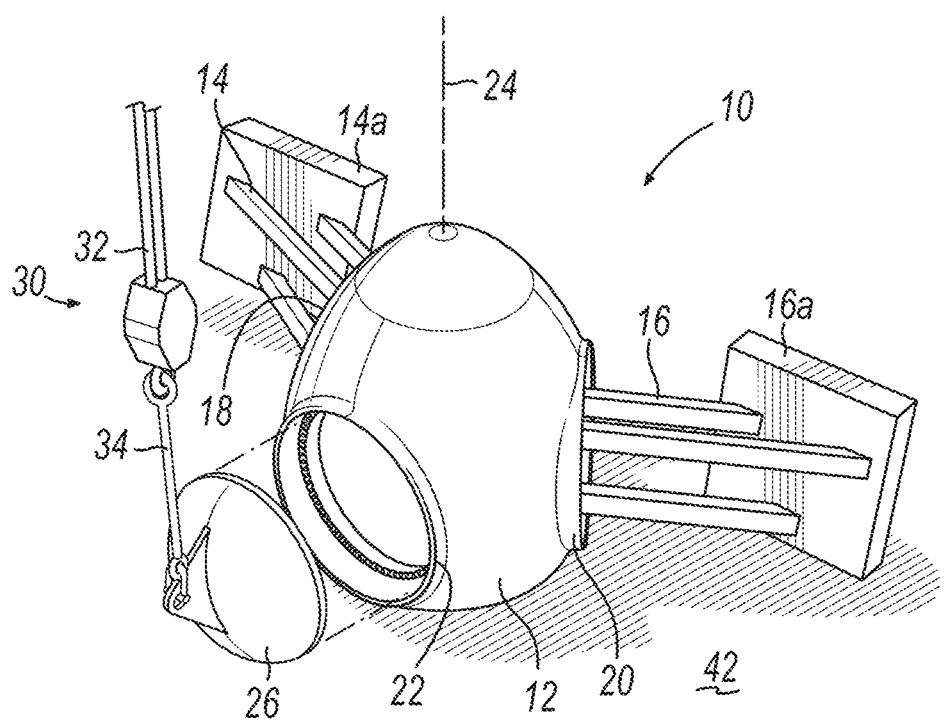
FIG. 1 is a perspective view of a rotor hub and counterweight assembly in accordance with a first embodiment of the invention and illustrating an initial step during an assembly and installation process.
Figure 2:
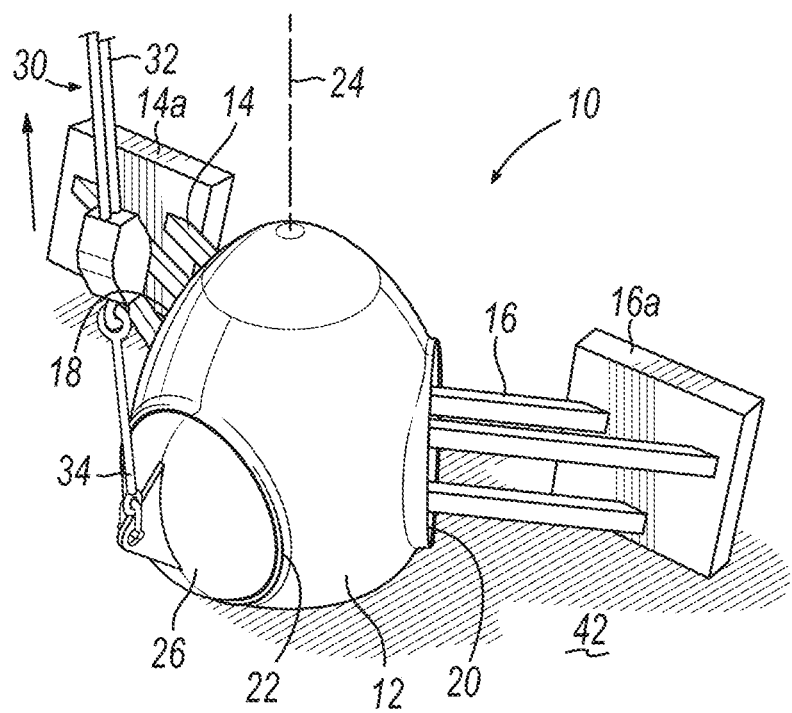
FIG. 2 is a perspective view similar to FIG. 1, but illustrating a further portion of the method with a lifting apparatus connecting member installed on the rotor hub.
Figure 3:
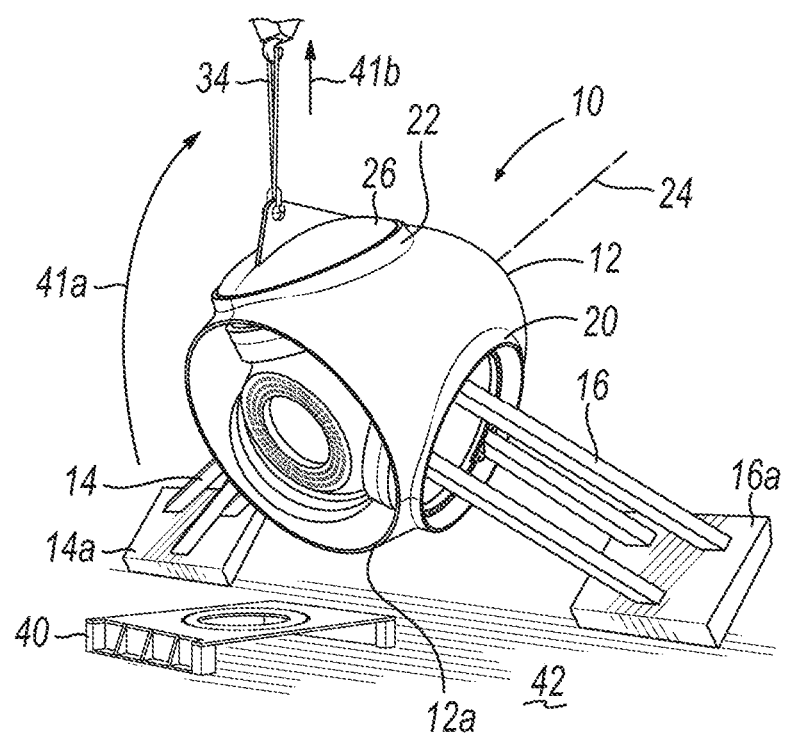
FIG. 3 is a perspective view similar to FIG. 2, but illustrating a further step or portion of the lifting procedure.

Referring first to FIGS. 1 and 2, an assembly 10 is configured in accordance with a first illustrative embodiment. The assembly 10 includes a rotor hub 12 coupled with first and second counterweights 14, 16. This assembly 10 is used when installing a rotor on a wind turbine (not shown). The rotor hub 12 includes first, second and third flanges 18, 20, 22 at positions spaced 120° apart and extending around the axis of rotation 24 of the rotor hub 12. A first counterweight 14 is mounted to the first flange 18. A second counterweight 16 is mounted to the second flange 20. A lifting apparatus connecting member 26 is mounted to the third flange 22. It will be appreciated that one or more of the first counterweight 14, the second counterweight 16, or the lifting apparatus connecting member 26 may be mounted to their respective flanges 18, 20, 22 either at a downtower location just prior to lifting the assembly 10 uptower, or the assembly 10 may be manufactured or assembled either partially or completely at a remote location and transported to the downtower location. In FIG. 1, a portion of a lifting apparatus 30, namely, a cable 32 and connecting assembly 34 is shown coupled to the lifting apparatus connecting member 26 for use in assisting to mount the lifting apparatus connecting member 26 to the third flange 22. The lifting apparatus 30 may further comprise, for example, a crane (not shown). The first and second counterweights 14, 16 further comprise first and second base portions or feet 14a, 16a for standing the assembly 10 up at the downtower location after initially rotating the assembly 10 and before further lifting the assembly 10 to the uptower location (FIG. 3). The first and second counterweights 14, 16 extend generally in a radial direction away from the central axis of rotation 24 of the rotor hub 12. As further shown in FIG. 3, a support platform 40 may be provided at the downtower location, such as on the ground 42, or on a support surface on the ground or, for example, on the deck of a shipping vessel (not shown). A connection side 12a of the rotor hub 12 is supported on the platform 40 prior to the rotating and lifting operation shown in FIG. 3 performed by lifting the cable 32 represented by respective arrows 41a, 41b. As shown by arrow 41a, the initial rotation of the assembly 10 occurs in a direction transverse to the rotor axis of rotation 24.

Figure 4:
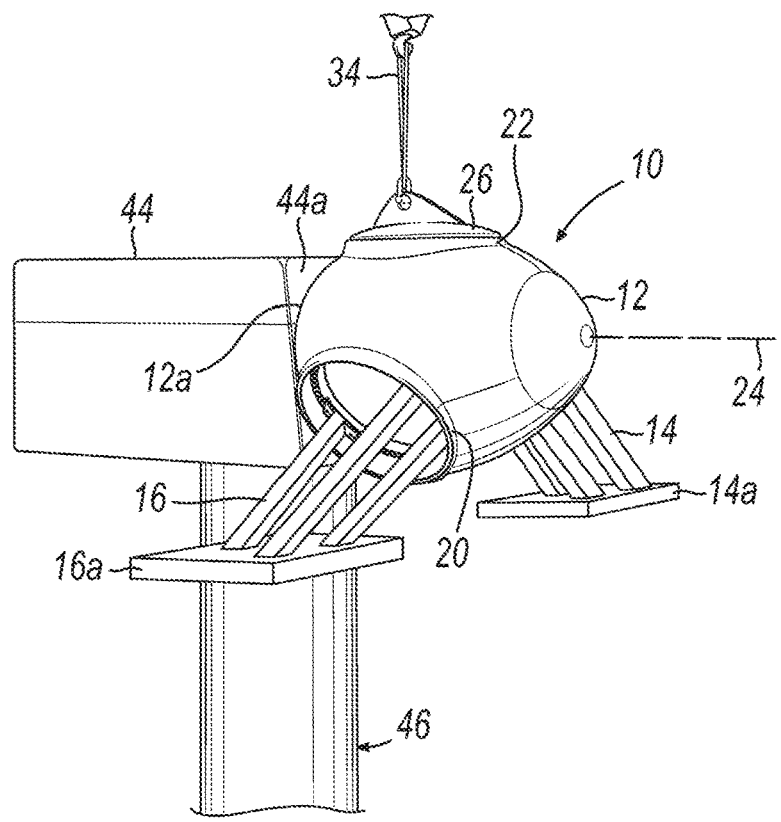
FIG. 4 is a perspective view illustrating another portion later in the procedure showing the rotor hub and counterweight assembly being installed onto a nacelle at an uptower location.
Figure 4A:
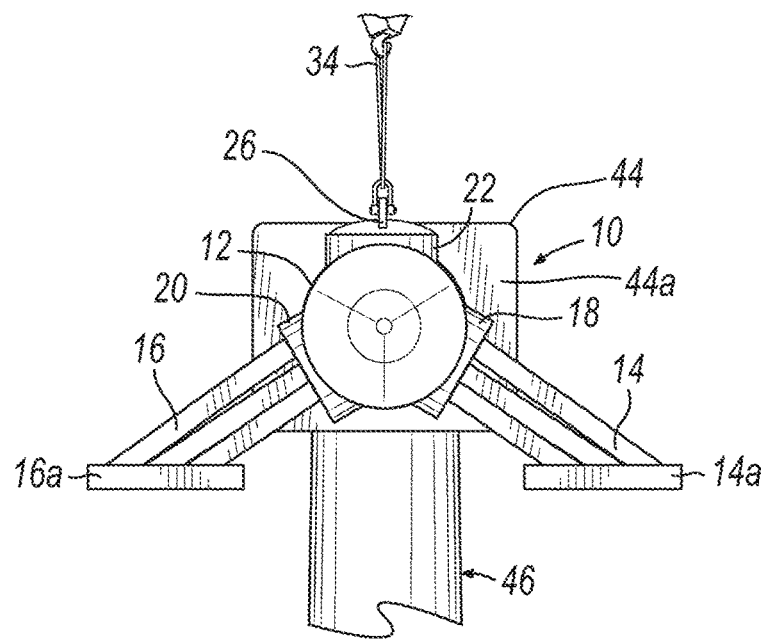
FIG. 4A is a front elevational view of the hub and counterweight assembly as shown in FIG. 4.

FIGS. 4 and 4A illustrate the assembly 10 lifted to an uptower location adjacent a hub connection side 44a of a nacelle 44 associated with the wind turbine 46. The rotor hub 12 is mounted to the nacelle 44 such that the third flange 22 with the lifting apparatus connecting member 26 are oriented at the 12-o'clock position, when viewing the connection side of the nacelle 44 as the face of a clock. As further shown in FIG. 4, the first and second flanges 18, 20 and the respective first and second counterweights 14, 16 are located at the 4-o'clock and 8-o'clock positions.

Figure 5A:
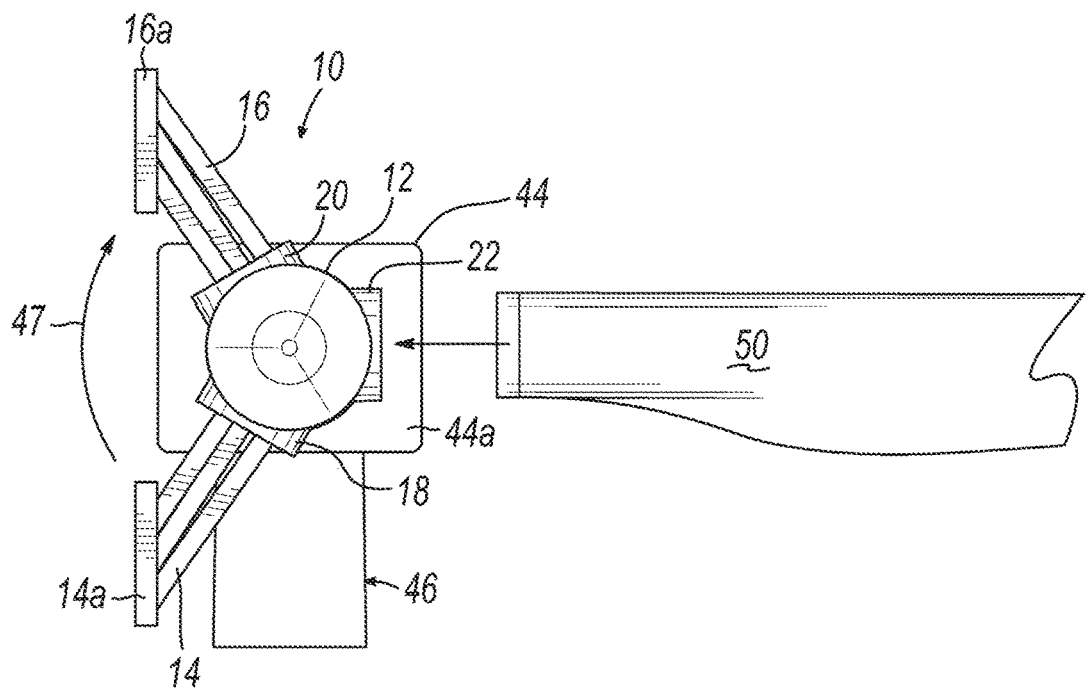
FIG. 5A is a front elevational view showing a further step in the installation procedure and a wind turbine blade being installed onto a flange of the rotor hub.
Figure 5B:
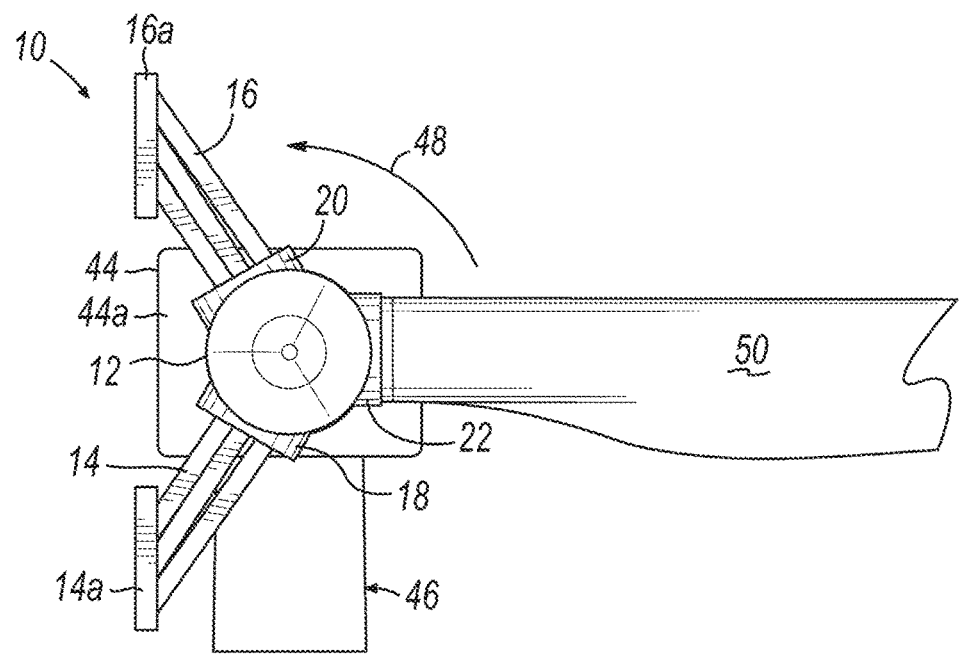
FIG. 5B is an elevational view similar to FIG. 5A, but illustrating the wind turbine blade fully attached and just prior to an initial rotation process.
Figure 5C:
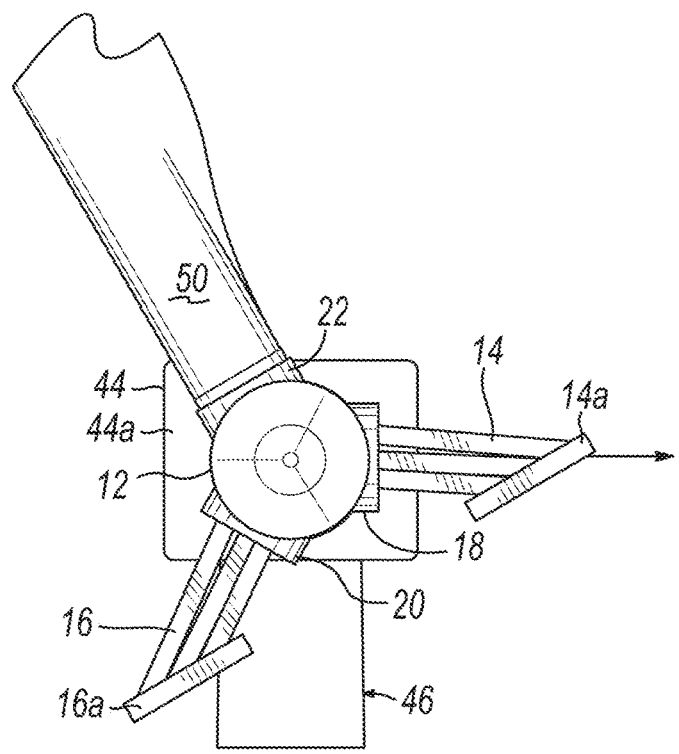
FIG. 5C is an elevational view similar to FIG. 5B, but illustrating the rotor hub rotated to a second position in which one of the counterweights is in the process of removal.
Figure 5D:
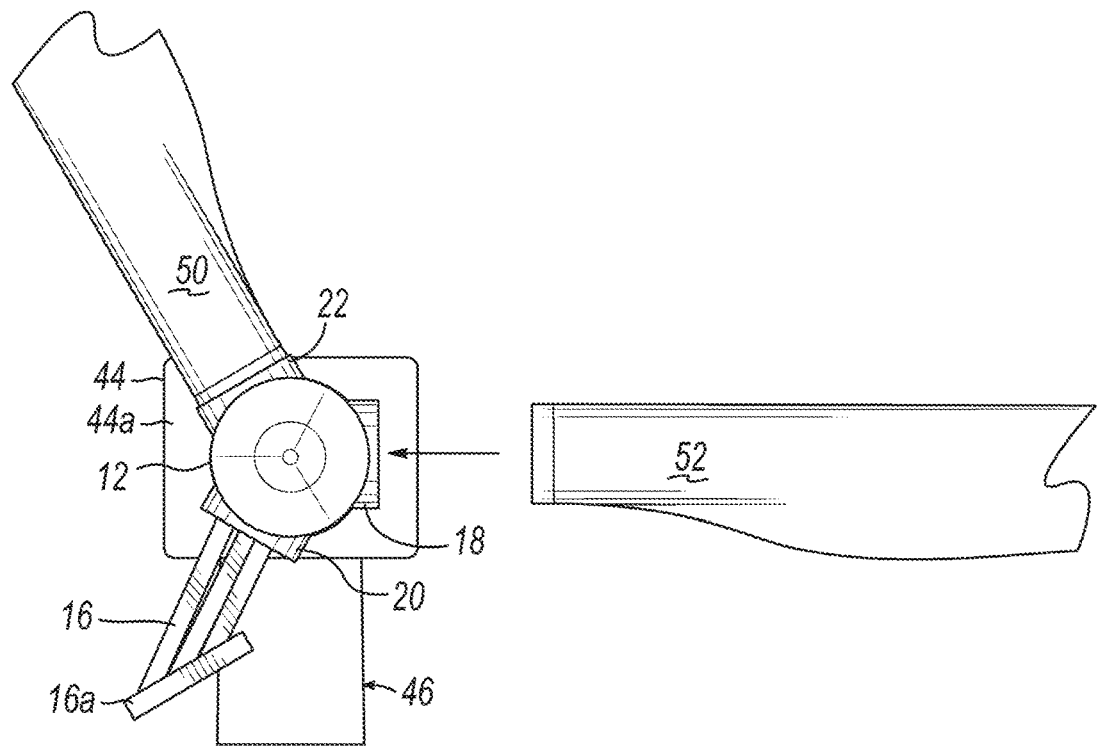
FIG. 5D is an elevational view similar to FIG. 5C, but showing the first counterweight removed and a second wind turbine blade being installed.
Figure 5E:
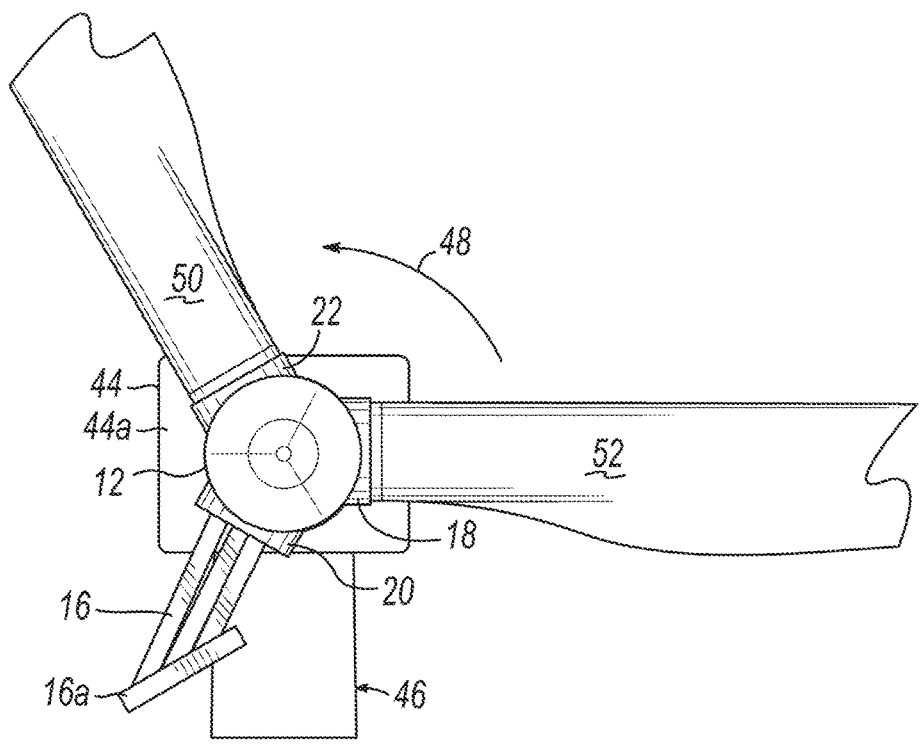
FIG. 5E is an elevational view similar to FIG. 5D, but illustrating the second wind turbine blade fully installed.
Figure 5F:
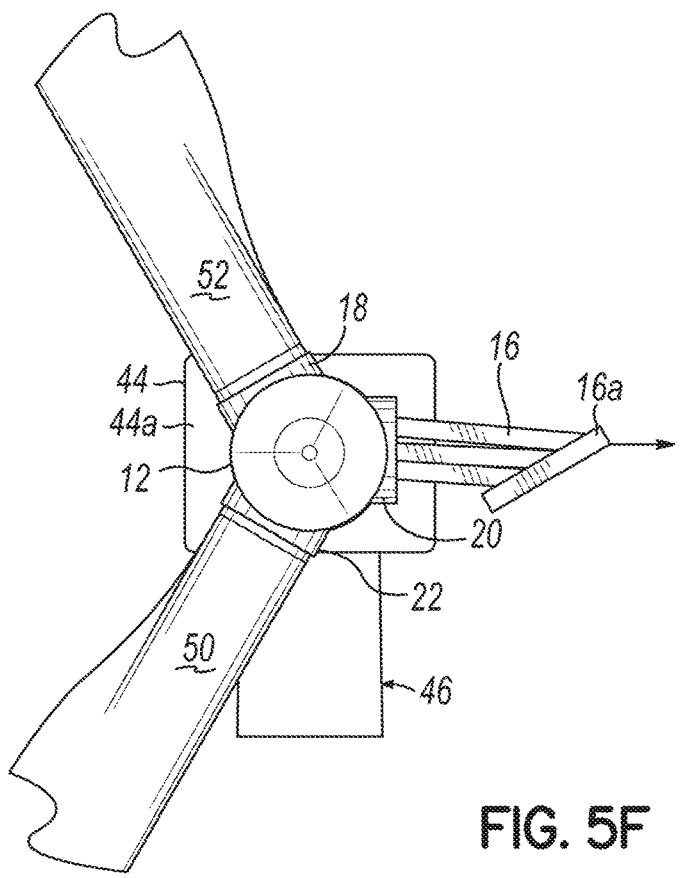
FIG. 5F is an elevational view similar to FIG. 5E, but illustrating the rotor hub rotated to the next position at which the second counterweight is being removed.
Figure 5G:
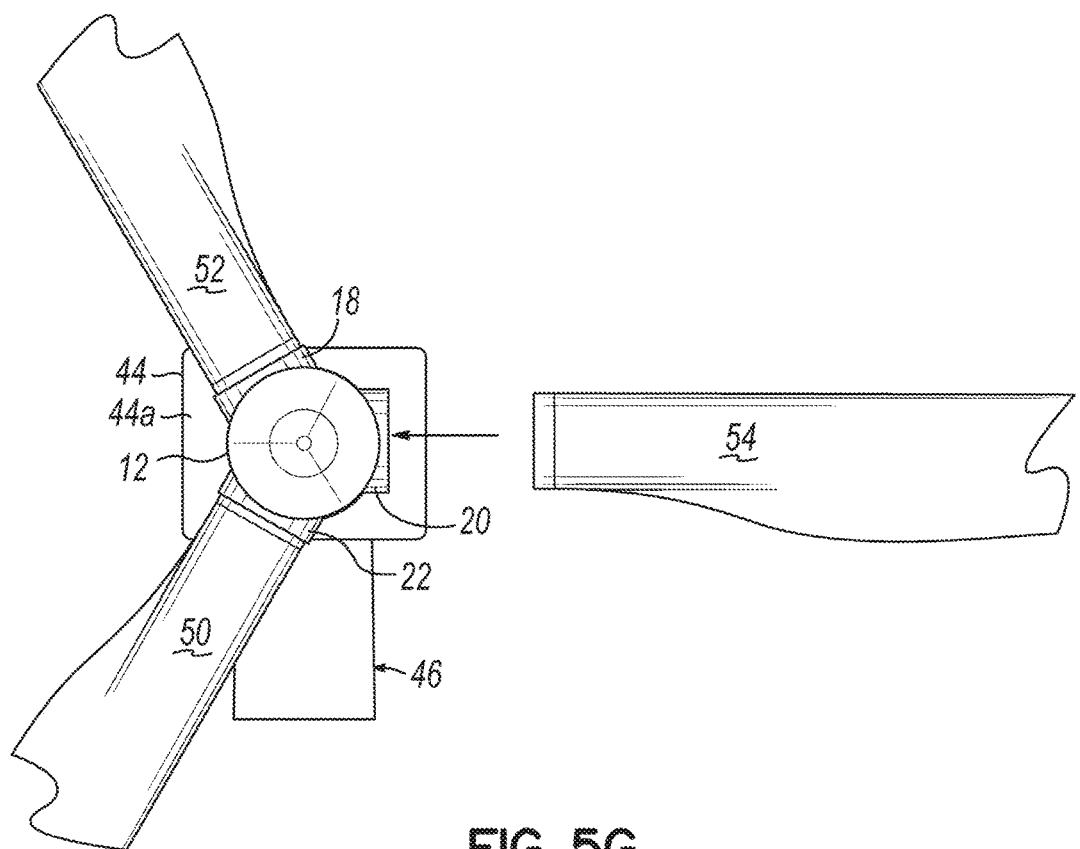
FIG. 5G is an elevational view similar to FIG. 5F, but illustrating the third wind turbine blade being installed.
Figure 5H:
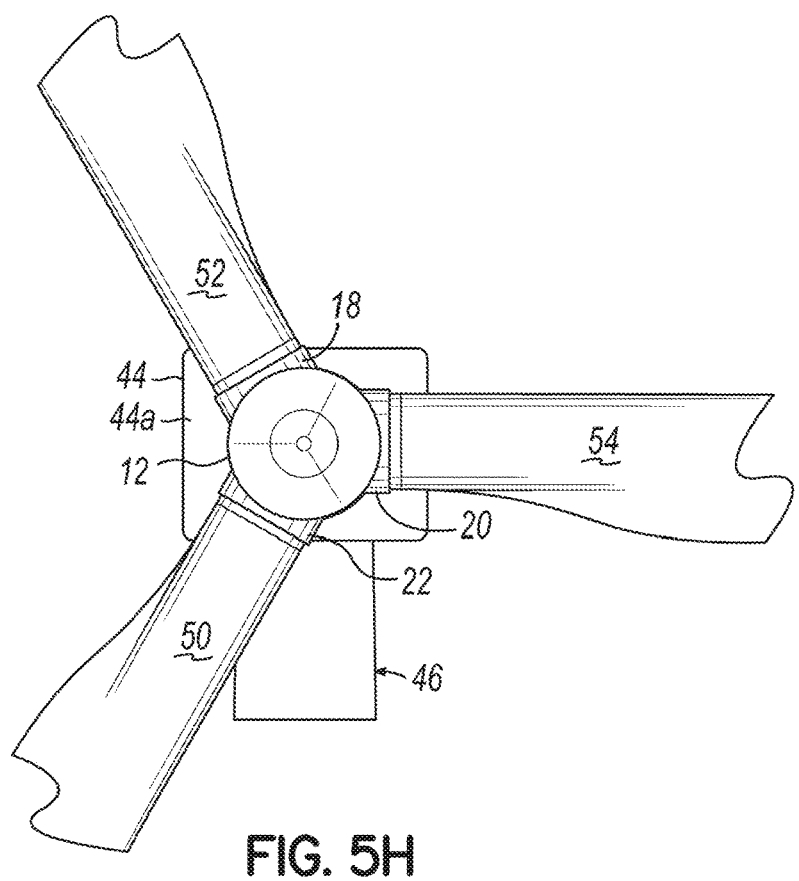
FIG. 5H is an elevational view similar to FIG. 5G, but illustrating the third wind turbine blade fully installed.

At this point in the process, the lifting apparatus connecting member 26 is removed and, as shown in FIG. 5A, the rotor hub 12 is rotated clockwise in the direction of arrow 47 such that the third flange 22 is at the 3-o'clock position, and the first and second flanges 18, 20 and first and second counterweights 14, 16 are respectively at the 7-o'clock and 11-o'clock positions. It will be appreciated that at each of the rotor positions discussed herein for purposes of mounting and/or removing a component, the rotor 12 is locked in place in a known manner. Also, it will be appreciated that removal and mounting of the various components at the uptower location will be assisted by the use of a lifting apparatus, such as a crane (not shown). As illustrated in FIGS. 5A and 5B, a first wind turbine blade 50 is mounted to the third flange 22 while the third flange 22 is at the 3-o'clock position. The rotor hub 12 is then rotated counterclockwise in the direction of arrow 48 (FIG. 5B) as shown in FIGS. 5C and 5D such that the first flange 18 and first counterweight 14 are at the 3-o'clock position, the third flange 22 and first wind turbine blade 50 are at the 11-o'clock position, and the second flange 20 and second counterweight 16 are at the 7-o'clock position. At this point in the process, the first counterweight 14 is removed at the 3-o'clock position as schematically illustrated in FIG. 5C. A second wind turbine blade 52 is then mounted to the first flange 18, as shown in FIGS. 5D and 5E while the first flange 18 is at the 3-o'clock position. As illustrated by FIGS. 5E and 5F, the rotor hub 12 is then rotated in the direction of arrow 48 such that the second flange 20 and second counterweight 16 are at the 3-o'clock position, the first flange 18 and second wind turbine blade 52 are at the 11-o'clock position, and the third flange 22 and first wind turbine blade 50 are at the 7-o'clock position. The second counterweight 16 is then removed at the 3-o'clock position and, as further shown in FIGS. 5G and 5H, a third wind turbine blade 54 is mounted to the second flange 20 while the second flange 18 is at the 3-o'clock position.

Figure 6:
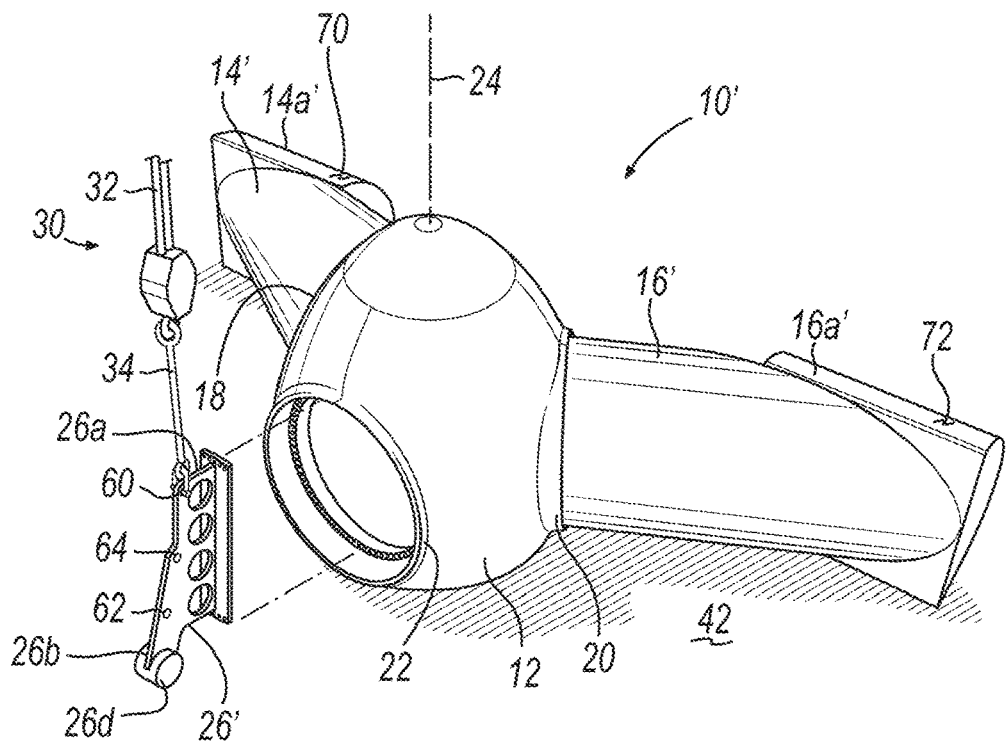
FIG. 6 is a perspective view similar to FIG. 1, but illustrating a second illustrative embodiment of a rotor hub and counterweight assembly in accordance with the invention and showing installation of a lifting apparatus connecting member.
Figure 7:
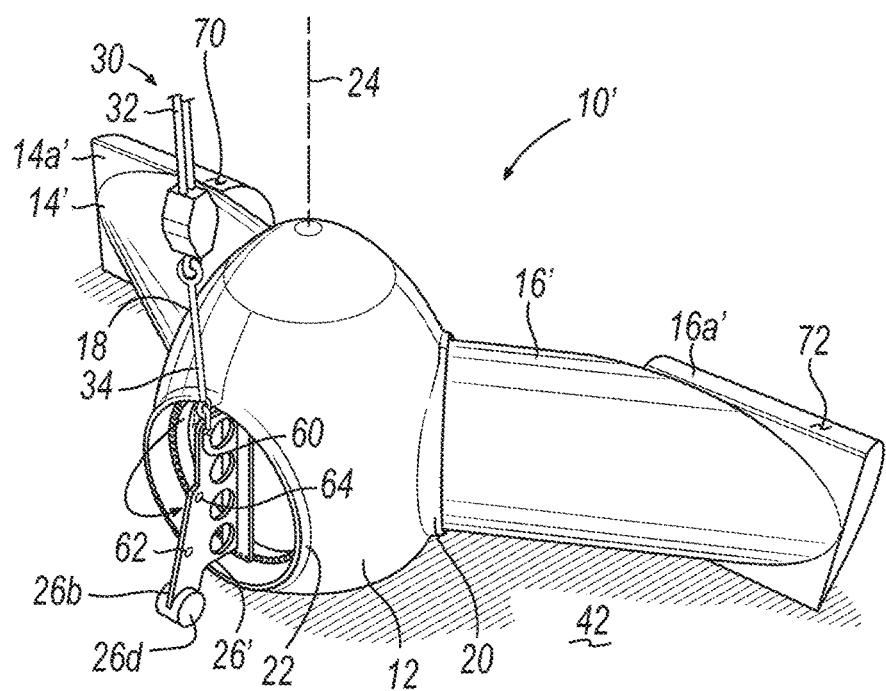
FIG. 7 is a perspective view similar to FIG. 6, but illustrating the lifting apparatus connecting member fully installed on the third flange of the rotor hub.

Turning now to FIGS. 6-9, a second embodiment of an assembly 10' comprising a rotor hub 12 and first and second counterweights 14', 16' is shown, along with a second embodiment of a lifting apparatus connecting member 26'. It will be appreciated that the structure and methods associated with the second embodiment are very similar to those described with respect to the first embodiment and, therefore, primary focus will be centered on a description of the differences between the first and second embodiments. Like elements between the two embodiments are identified with like reference numbers, while elements of the second embodiment that are analogous to elements of the first embodiment but have certain described and/or illustrated differences in structure and function are identified with like reference numbers having prime (') marks. As shown in FIGS. 6 and 7, the lifting apparatus connecting member 26' is mounted on the third flange 22 of the rotor hub 12 by coupling the lifting apparatus 30, i.e., the connecting assembly 34 to a first connection point 60 located proximate one end 26a of the lifting apparatus connecting member 26'. The lifting apparatus connecting member 26' includes lifting points 62, 64 for use, respectively, during removal of the connecting member 26' and during the rotating and lifting procedure, to be described below. Lifting point 64 may be referred to as a carrying lifting point. Each lifting point 60, 62, 64 corresponds to and results in a different suspension angle of the connecting member 26' when coupled to the lifting apparatus 30 and suspended with or without being further coupled to the rotor hub 12. When the lifting apparatus 30 is coupled to an installing lifting point 60, the connecting member 26' will hang generally in a substantially vertical orientation for easier installation on the rotor hub 12. Removal of the connecting member 26' from the attached hub is made easier by coupling the lifting apparatus 30 to the removal lifting point 62, as will be discussed below. A connecting member counterweight 26d on the connecting member 26' may be included to assist with properly orienting the connecting member 26' during its removal from the rotor hub 12, when the connecting member 26' is freely suspended from a lifting wire. In particular, when freely suspended from its removal lifting point 62, the connecting member 26' may adopt a substantially horizontal orientation. Said connecting member counterweight 26d may extend outboard of said removal lifting point 62, in relation to said connecting member 26'. As further discussed below, coupling the carrying lifting point 64 to the lifting apparatus 30 ensures that the assembly 10' is properly oriented as it is raised to the uptower location and positioned adjacent the connection side 44a of the nacelle 40. In this position, a connection side 12a at the rotor hub 12, for attachment to a mainshaft face at a connection side 44a at a wind turbine nacelle 44, may adopt an orientation which presents the connection side 12a parallel to a nacelle mainshaft face.

Figure 9:
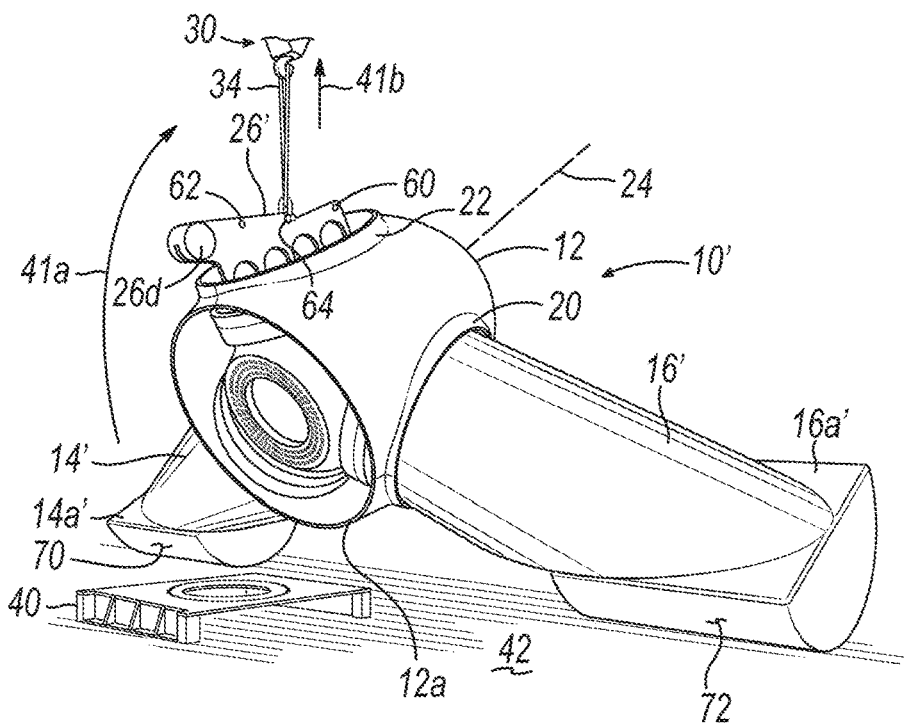
FIG. 9 is a perspective view similar to FIG. 8, but illustrating an initial rotating and lifting operation being performed.

The assembly 10' comprises first and second counterweights 14', 16' that extend in a generally radial direction relative to the central axis of rotation 24 of the rotor hub 12. The lifting apparatus connecting member 26', the first counterweight 14', and the second counterweight 16' may be mounted or installed on the rotor hub 12 either at the downtower location immediately prior to the rotor assembly and installation method described herein, or at a more remote location for transport to the downtower location. The first and second counterweights 14', 16' include feet 14a', 16a', similar to the first embodiment, however, these feet 14a', 16a' have convexly shaped or configured surfaces 70, 72 for easing the rotation step as compared to the first embodiment and as shown in FIG. 9 in this second embodiment. The surfaces 70, 72 may more specifically be convexly curved as shown for allowing a smooth rotating procedure as the base portions 14a', 16a' are contacting either the ground 42 or a support surface, for example, on the ground or on a shipping vessel (not shown). As shown, the surfaces 70, 72 are semi-cylindrical and aligned along a common axis at least during the initial rotating/lifting process shown in FIG. 9 to ensure smooth pivoting movement. Other shapes for the convexly shaped feet, which are not specifically shown in the drawings, may be used to advantage. For example, the convex outer surfaces on which the feet 14a', 16a' rest and rotate may be generally spherical or semi-spherical, cylindrical, or of any other outer configuration having an outer, convex surface for supporting the assembly 10' on a surface 42. Generally spherical or semi-spherical feet, as well as other convexly configured designs, can allow for support and rotation of the assembly 10' even when the counterweights 14', 16' are pitched or angled relative to the rotor hub 12 at one of various angles. The convex surfaces in any embodiment may comprise segments of flat surfaces, or a continuously curved surface (as shown), or combinations of both flat and curved surfaces, for example. In addition, the use of suitably configured feet, such as feet 14a', 16a' or other designs, will allow a substantial amount of the ballast or weight associated with the counterweights 14', 16' to be concentrated in the feet or base portions 14a', 16a' of the counterweights 14', 16'.

Figure 8:
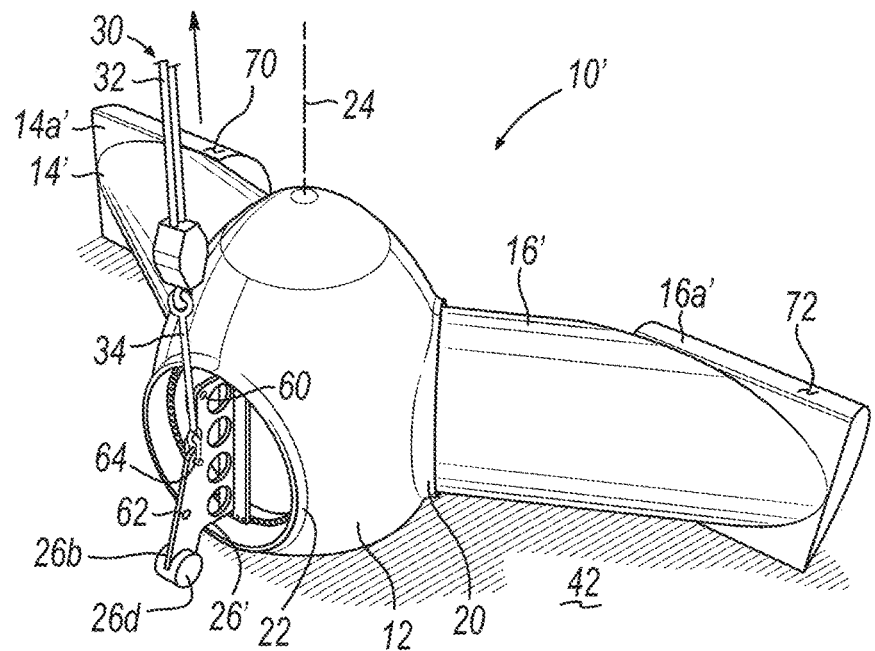
FIG. 8 is a perspective view similar to FIG. 7, but illustrating the lifting apparatus attached to a second connection point of the lifting apparatus connecting member for use in rotating and lifting the rotor hub and counterweight assembly from a downtower location to an uptower location.
Figure 10:
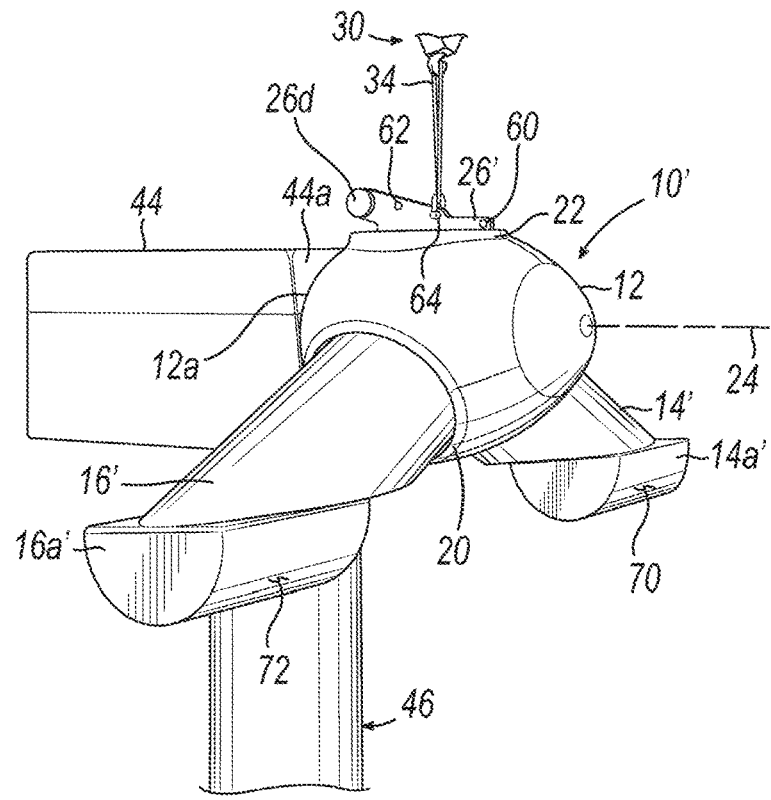
FIG. 10 is a perspective view illustrating a subsequent part of the procedure in which the rotor hub and counterweight assembly are installed onto a nacelle at an uptower location.
Figure 10A:
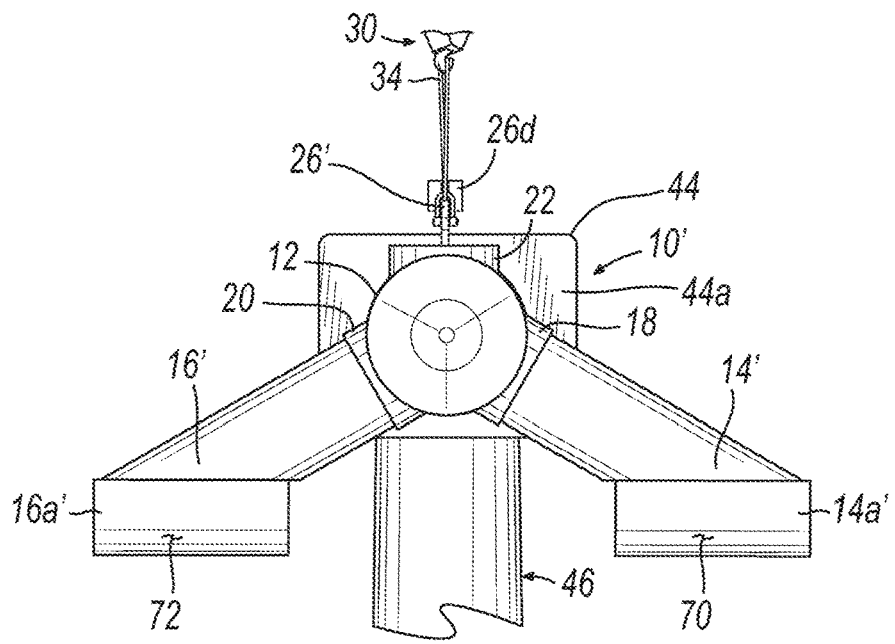
FIG. 10A is a front elevational view of the hub and counterweight assembly as shown in FIG. 10.

As schematically illustrated in FIGS. 7 and 8, after the lifting apparatus connecting member 26' has been mounted to the third flange 22, the lifting apparatus connecting assembly 34 is removed from lifting point 60 used for installation or mounting the connecting member 26' and coupled to the more central, carrying lifting point 64 used for the rotation and lifting operation. The installing lifting point 60 may be located proximate one end 26a of the connecting member 26'. A removal lifting point 62 may be located proximate an opposite end 26b of said connecting member 26'. After this reconnection, as shown in FIG. 9, the lifting apparatus 30 lifts in an upward direction as shown by the arrow 41b and the assembly 10' first rotates off of a support platform 40, for example, as the assembly 10' is supported by the convex feet 14a', 16a' into an upright position. As with the first embodiment, rotation occurs in the direction of arrow 41a. The lifting apparatus 30 further lifts the assembly 10' to the uptower location, as shown in FIGS. 10 and 10A, while coupled to a carrying lifting point 64. As with the first embodiment, the connection side 12a of the rotor hub 12 is coupled to the hub connection side 44a on the nacelle 44 as shown in FIG. 10. Lifting the assembly 10' with the lifting apparatus 30 coupled to a carrying lifting point 64 will cause the assembly 10' to rotate about 90 degrees during the lifting process. The resulting orientation shown in FIGS. 9, 10 and 10A properly orients the assembly 10' such that the connection side 12a of the rotor hub 12 can be more accurately aligned with and mounted to the connection side 44a of the nacelle 44.

The lifting apparatus connecting assembly 34 is then disconnected from the central lifting point 64 and reconnected to the connecting member 26' at a removal lifting point 62 proximate the second end 26b of the connecting member 26'. Upon lifting at this removal lifting point 62, the lifting apparatus connecting member 26' may be removed from the third flange 22. The connecting member 26' may adopt a substantially horizontal position when freely suspended from its removal lifting point 62. A counterweight 26d at the connecting member 26' may ensure that the connecting member 26' adopts a substantially horizontal position when suspended from its removal lifting point 62. The remainder of the rotor assembly method may be the same as previously described with regard to the first embodiment, as summarized below.

Figure 11A:
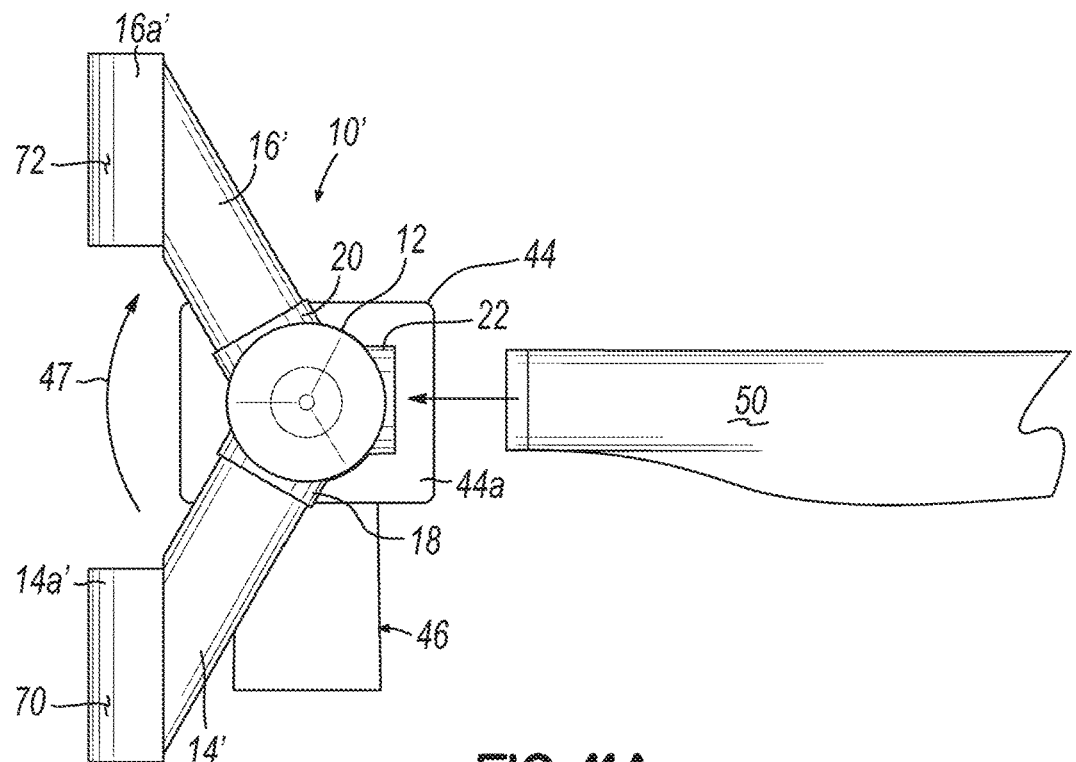
FIG. 11A is a front plan view or elevational view of the second embodiment showing a further step in the installation procedure and a wind turbine blade being installed onto a flange of the rotor hub.
Figure 11B:
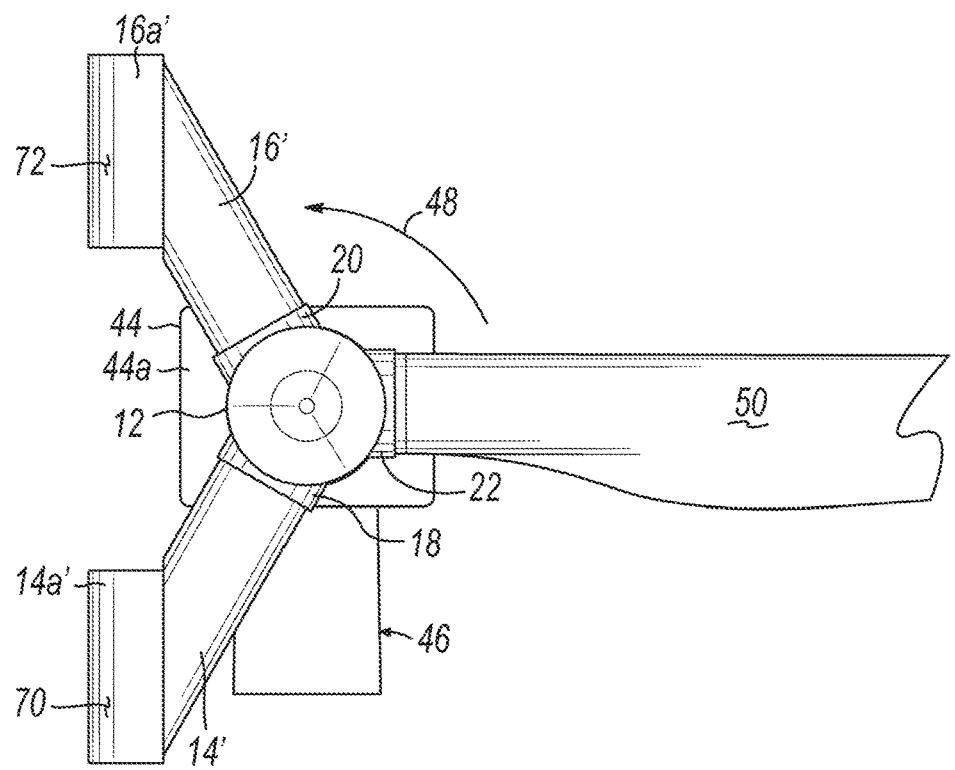
FIG. 11B is an elevational view similar to FIG. 11A, but illustrating the wind turbine blade fully attached just prior to an initial rotation process.
Figure 11C:
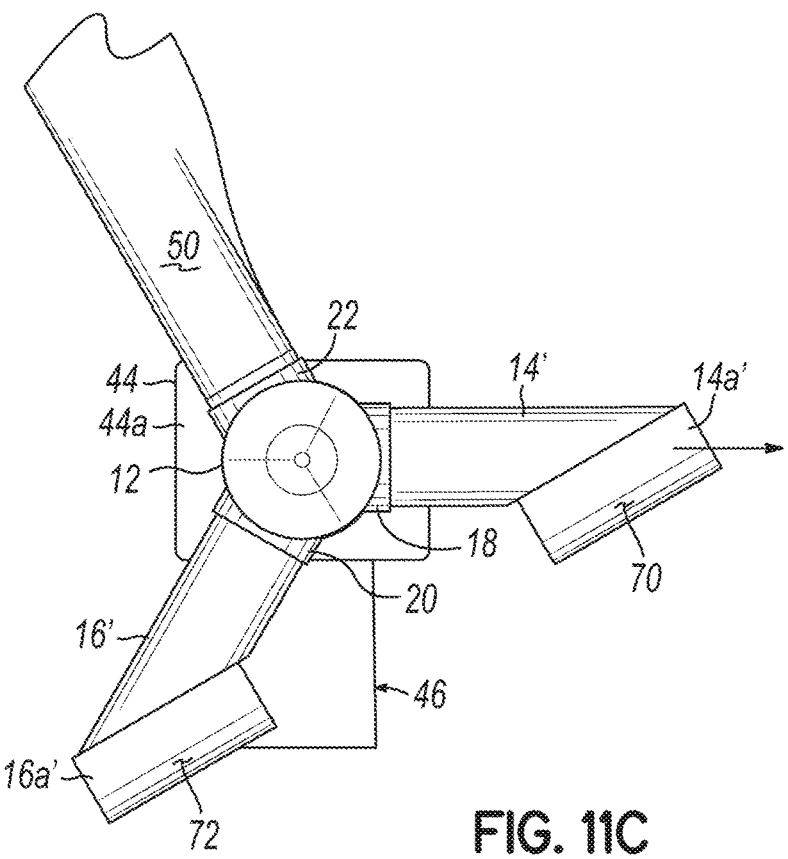
FIG. 11C is a plan or elevational view similar to FIG. 11B, but illustrating the rotor hub rotated to a second position in which one of the counterweights is in the process of removal.
Figure 11D:
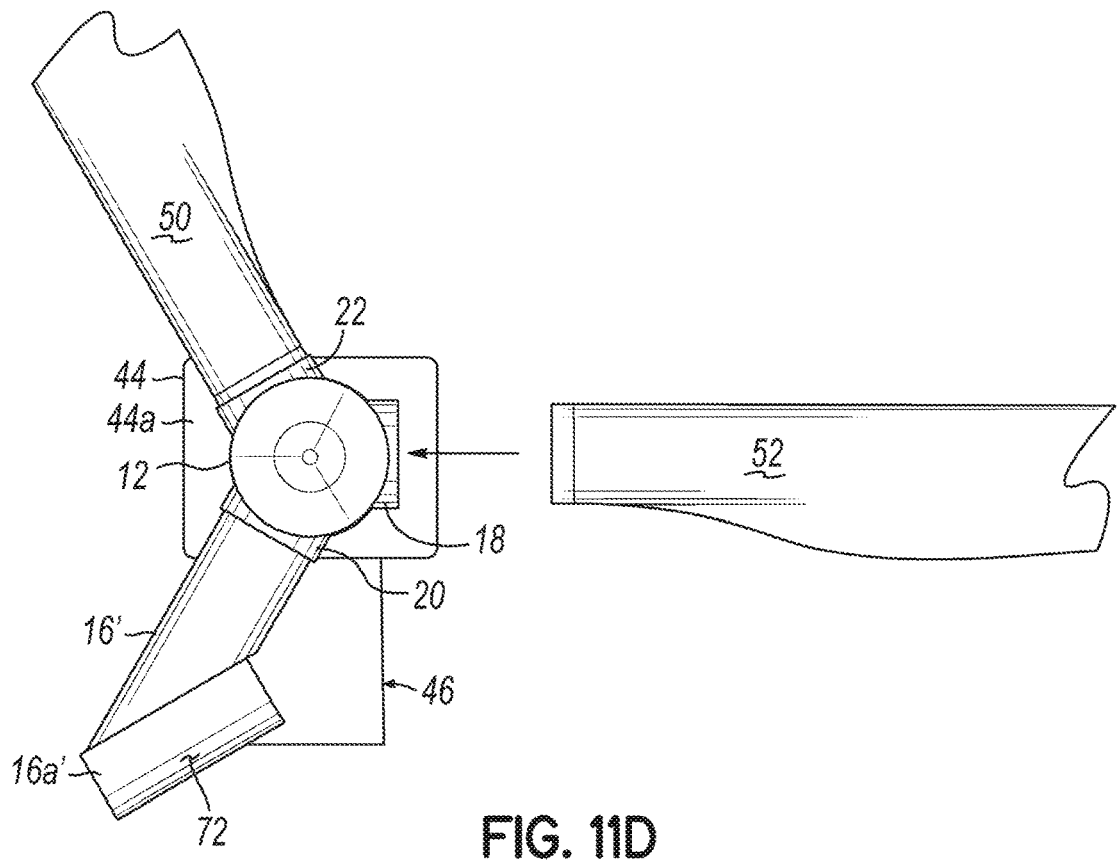
FIG. 11D is an elevational view similar to FIG. 11C, but showing the first counterweight removed and a second wind turbine blade being installed.
Figure 11E:
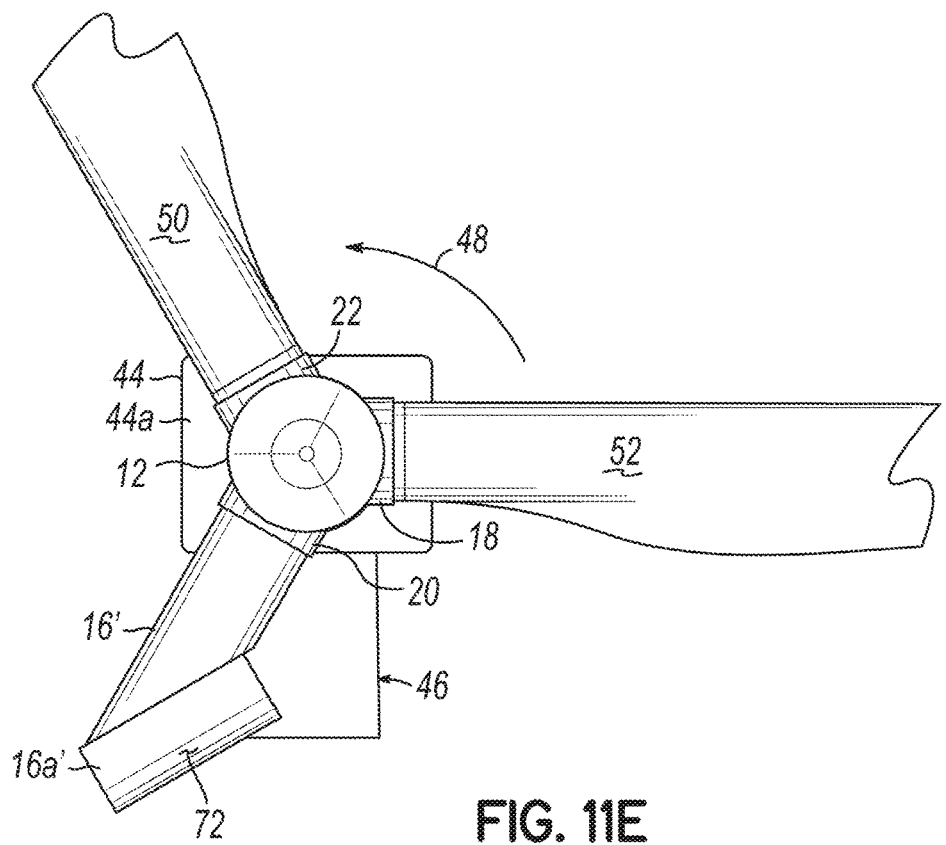
FIG. 11E is an elevational view similar to FIG. 11D, but illustrating the second wind turbine blade fully installed.
Figure 11F:
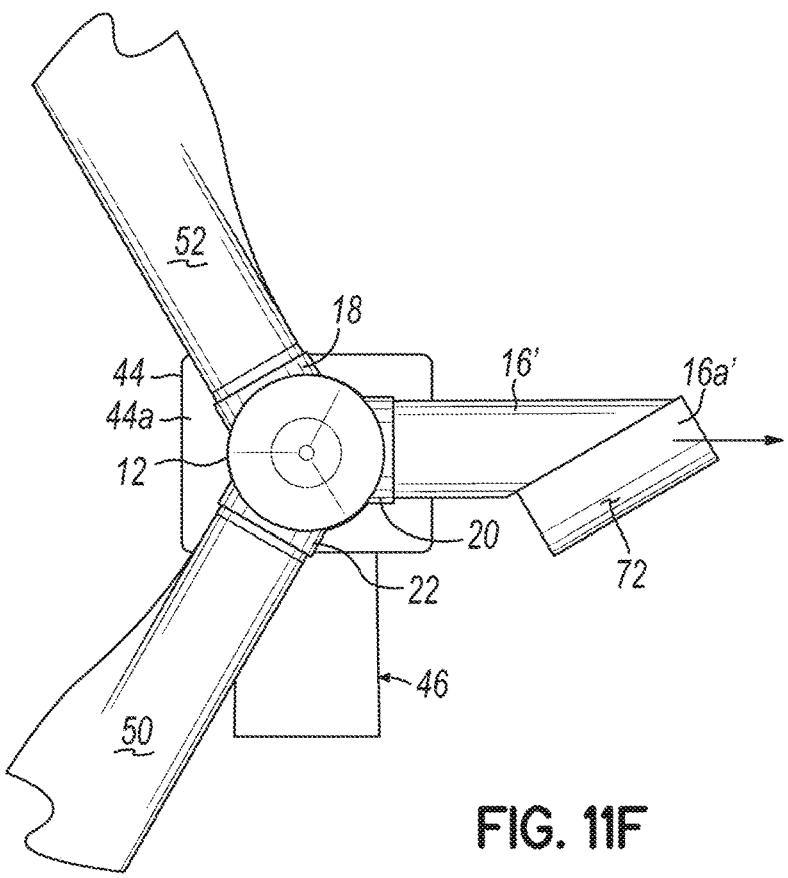
FIG. 11F is an elevational view similar to FIG. 11E, but illustrating the rotor hub rotated to the next position at which the second counterweight is being removed.
Figure 11G:
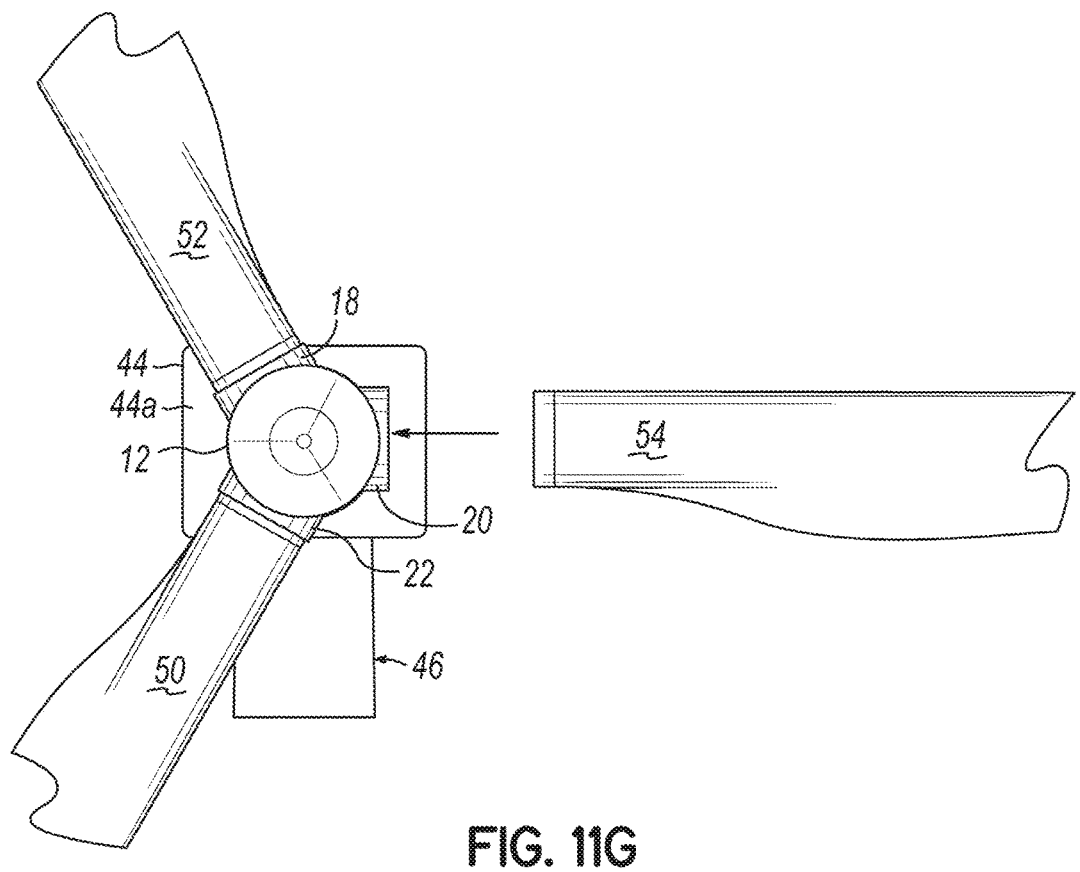
FIG. 11G is an elevational view similar to FIG. 11F, but illustrating the third wind turbine blade being installed.
Figure 11H:
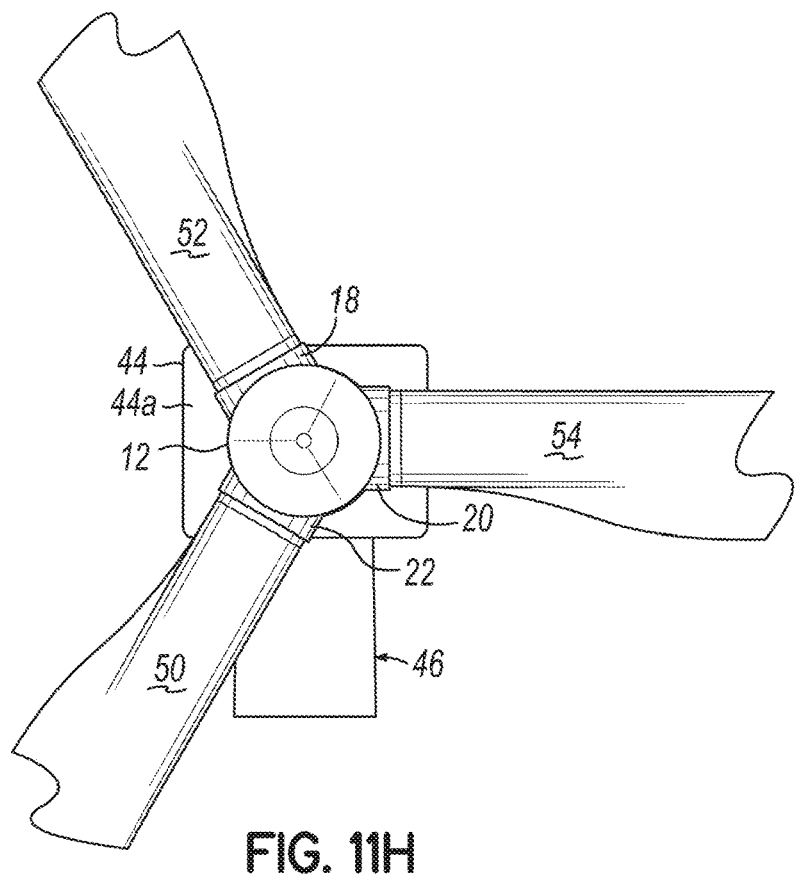
FIG. 11H is an elevational view similar to FIG. 11G, but illustrating the third wind turbine blade fully installed.

As illustrated in FIGS. 11A and 11B, a first wind turbine blade 50 is mounted to the third flange 22 after the third flange 22 has been rotated and locked at the 3-o'clock position. The rotor hub 12 is then rotated as shown in FIGS. 11C and 11D such that the first flange 18 and first counterweight 14' are at the 3-o'clock position, the third flange 22 and first wind turbine blade 50 are at the 11-o'clock position, and the second flange 20 and second counterweight 16' are at the 7-o'clock position. At this point in the process, the first counterweight 14' is removed at the 3-o'clock position as schematically illustrated in FIG. 11C. A second wind turbine blade 52 is then mounted to the first flange 18, as shown in FIGS. 11D and 11E while the first flange 18 is at the 3-o'clock position. As illustrated by FIGS. 11E and 11F, the rotor hub 12 is then rotated and locked such that the second flange 20 and second counterweight 16' are at the 3-o'clock position, the first flange 18 and second wind turbine blade 52 are at the 11-o'clock position, and the third flange 22 and first wind turbine blade 50 are at the 7-o'clock position. The second counterweight 16' is then removed at the 3-o'clock position and, as further shown in FIGS. 11G and 11H, a third wind turbine blade 54 is mounted to the second flange 20 while the second flange 20 is at the 3-o'clock position.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user. For example, the lifting apparatus connecting member 26' of the second embodiment may be used with the rotor hub 12 and counterweights 14, 16 of the first embodiment, and the counterweights 14', 16' of the second embodiment may be used with the rotor hub 12 and lifting apparatus connecting member 26 of the first embodiment.

The invention claimed is:

1. A method of installing a rotor on a nacelle of a wind turbine, the method comprising:
    providing a rotor hub at a downtower location, the rotor hub having first, second and third flanges at positions spaced 120 degrees apart and extending around the axis of rotation of the rotor hub;
    providing a first counterweight mounted to the first flange at the downtower location;
    providing a second counterweight mounted to the second flange at the downtower location;
    providing a lifting apparatus connecting member mounted to the third flange;
    connecting a portion of a lifting apparatus to the lifting apparatus connecting member at the downtower location;
    lifting the rotor hub and the first and second mounted counterweights by the lifting apparatus connecting member to an uptower location adjacent a hub connection side of the nacelle; and
    mounting the rotor hub to the hub connection side.

2. The method of claim 1, further comprising:
    mounting the rotor hub to the hub connection side such that the third flange is at the 12-o'clock position, and the first and second flanges are respectively at the 4-o'clock and 8-o'clock positions;
    removing the lifting apparatus connecting member;
    rotating the rotor hub such that the third flange is at the 3-o'clock position, and the first and second flanges and the first and second counterweights are respectively at the 7-o'clock and 11-o'clock positions;
    mounting a first wind turbine blade to the third flange while the third flange is at the 3-o'clock position;
    rotating the rotor hub such that the first flange and first counterweight are at the 3-o'clock position, the third flange and first wind turbine blade are at the 11-o'clock position, and the second flange and second counterweight are at the 7-o'clock position;
    removing the first counterweight at the 3-o'clock position;
    mounting a second wind turbine blade to the first flange while the first flange is at the 3-o'clock position;
    rotating the rotor hub such that the second flange and second counterweight are at the 3-o'clock position, the first flange and second wind turbine blade are at the 11-o'clock position, and the third flange and first wind turbine blade are at the 7-o'clock position;
    removing the second counterweight at the 3-o'clock position; and
    mounting a third wind turbine blade to the second flange while the second flange is at the 3-o'clock position.

3. The method of claim 1, further comprising:
    rotating the rotor hub in a direction transverse to the axis of rotation of the rotor hub during the step of lifting the rotor hub.

4. The method of claim 1, wherein lifting the rotor hub further comprises:
    initially standing the rotor hub on respective first and second base portions of the first and second counterweights at the downtower location.

5. The method of claim 4, wherein the first and second base portions comprise convexly configured feet and lifting the rotor hub further comprises:
    initially rotating the rotor hub in a direction transverse to the axis of rotation of the rotor hub while supporting the rotor hub on the convexly configured feet.

6. The method of claim 1, wherein the lifting apparatus connecting member further comprises first and second connection points, and the method further comprises:
    using the first connection point to move the lifting apparatus connecting member into position for mounting to the third flange; and
    using the second connection point during the step of lifting the rotor hub and the first and second mounted counterweights to the uptower location.

7. The method of claim 6, wherein the lifting apparatus connecting member further comprises a third connection point, and the method further comprises:
    using the third connection point while removing the lifting apparatus connecting member from the third flange.

8. A rotor hub and counterweight assembly for use when installing a rotor on a wind turbine, the assembly comprising:
    a rotor hub having first, second and third flanges at positions spaced 120 degrees apart and extending around the axis of rotation of the rotor hub;
    a first counterweight mounted to the first flange;
    a second counterweight mounted to the second flange; and
    a lifting apparatus connecting member mounted to the third flange,
    wherein the first and second counterweights further comprise first and second feet for standing the assembly up at a downtower location after initially rotating the assembly and before further lifting the assembly to an uptower location.

9. The assembly of claim 8, wherein the first and second feet are convexly configured feet for initially rotating the rotor hub approximately 90 degrees in a direction extending transverse to the axis of rotation of the rotor hub while supporting the rotor hub on the convexly configured feet.

10. The assembly of claim 8, wherein the lifting apparatus connecting member further comprises first and second connection points, wherein the first connection point is used to move the lifting apparatus connecting member into position for mounting to the third flange, and the second connection point is used to rotate and lift the assembly to an uptower location.

11. The assembly of claim 10, wherein the lifting apparatus connecting member further comprises a third connection point, wherein the third connection point is used to remove the lifting apparatus connecting member from the third flange.

12. A lifting apparatus connecting member configured to be mounted to a flange of a wind turbine rotor hub, the lifting apparatus connecting member being couplable to a lifting apparatus for lifting the rotor hub and mounted counterweights from a downtower location to an uptower location and mounting the rotor hub to a wind turbine nacelle, the lifting apparatus connecting member including at least two connection points for coupling with the lifting apparatus, the at least two connection points being configured for allowing at least two of the three following operations: i) installing the lifting apparatus connecting member on the third flange, ii) rotating and lifting the rotor hub and counterweights to the uptower location, and iii) removing the lifting apparatus connecting member from the third flange.

13. The lifting apparatus connecting member of claim 12, further comprising a third connection point for allowing the third of the three operations to be performed.

14. The lifting apparatus connecting member of claim 13, wherein the lifting apparatus connecting member includes first and second ends and a wherein first connection point for installing the lifting apparatus connecting member on the third flange is located proximate the first end, a second connection point for removing the lifting apparatus connecting member from the third flange is located proximate the second end, and a third connection point for rotating and lifting the rotor hub and counterweights is located between the first and second connection points.

\* \* \* \* \*